US009170364B2

(12) United States Patent
Ezell et al.

(10) Patent No.: US 9,170,364 B2
(45) Date of Patent: Oct. 27, 2015

(54) LIGHTING ASSEMBLY WITH A LIGHT GUIDE HAVING LIGHT-REDIRECTING EDGE FEATURES

(71) Applicant: Rambus Delaware LLC, Brecksville, OH (US)

(72) Inventors: Robert M Ezell, Brunswick, OH (US); Martin E Ligas, Wadsworth, OH (US); Timothy A McCollum, Avon Lake, OH (US); Gregg M Podojil, Brecksville, OH (US)

(73) Assignee: Rambus Delaware LLC, Brecksville, OH (US)

( * ) Notice: Subject to any disclaimer, the term of this patent is extended or adjusted under 35 U.S.C. 154(b) by 30 days.

(21) Appl. No.: 14/096,068

(22) Filed: Dec. 4, 2013

(65) Prior Publication Data

US 2014/0153282 A1    Jun. 5, 2014

Related U.S. Application Data

(60) Provisional application No. 61/733,452, filed on Dec. 5, 2012.

(51) Int. Cl.
*F21V 7/04* (2006.01)
*F21V 8/00* (2006.01)

(52) U.S. Cl.
CPC ............ *G02B 6/0068* (2013.01); *G02B 6/0016* (2013.01); *G02B 6/0021* (2013.01); *G02B 6/0085* (2013.01)

(58) Field of Classification Search
CPC .. G02B 6/0016; G02B 6/0068; G02B 6/0073; G02B 6/0085; G02B 6/0021; G02B 6/0035; G02B 6/0038; G02B 6/0015; G02B 6/0045; G02B 6/0046
See application file for complete search history.

(56) References Cited

U.S. PATENT DOCUMENTS

| | | | |
|---|---|---|---|
| 2006/0083476 A1* | 4/2006 | Winkler | 385/146 |
| 2007/0103936 A1* | 5/2007 | Yue | 362/613 |
| 2008/0278659 A1* | 11/2008 | Park | 349/65 |
| 2012/0044441 A1* | 2/2012 | Shigeta et al. | 349/65 |

* cited by examiner

*Primary Examiner* — Y M Lee
(74) *Attorney, Agent, or Firm* — Renner, Otto, Boisselle & Sklar, LLP (57) ABSTRACT

A lighting assembly includes a light source to emit on-axis light rays at smaller angles relative to an optical axis of the light source, and off-axis light rays at larger angles relative to the optical axis and spectrally different from the on-axis light rays. The lighting assembly additionally includes a light guide having a light input edge adjacent the light source and opposed major surfaces between which light from the light source propagates by total internal reflection. The light input edge has an edge feature aligned with the light source to receive light therefrom. The edge feature specularly redirects the on-axis light rays and the off-axis light rays differently to increase overlap between the on-axis light rays and the off-axis light rays within the light guide. The increased overlap reduces spatial color variation of light extracted from the light guide between locations at different angles from the optical axis.

25 Claims, 11 Drawing Sheets

LIGHTING ASSEMBLY WITH A LIGHT GUIDE HAVING LIGHT-REDIRECTING EDGE FEATURES

RELATED APPLICATION DATA

This application claims the benefit of U.S. Provisional Patent Application No. 61/733,452 filed Dec. 5, 2012, the disclosure of which is herein incorporated by reference in its entirety.

BACKGROUND

Energy efficiency has become an area of interest for energy consuming devices. One class of energy consuming devices is lighting devices. Solid-state light sources, such as light-emitting diodes (LEDs), show promise as energy efficient light sources for lighting devices. But there remains room for improvement in how to couple light from the solid-state light sources into other components of the lighting devices.

DESCRIPTION

Embodiments will now be described with reference to the drawings, in which like reference numerals are used to refer to like elements throughout. The figures are not necessarily to scale. Features that are described and/or illustrated with respect to one embodiment may be used in the same way or in a similar way in one or more other embodiments and/or in combination with or instead of the features of the other embodiments. In this disclosure, angles of incidence, reflection and refraction, and angles of propagation are measured relative to the normal to the surface.

Aspects of this disclosure relate to a lighting assembly. For instance, as described in greater detail below, the lighting assembly includes a light source and a light guide having a light input edge and opposed major surfaces between which light propagates by total internal reflection. The light input edge includes one or more edge features that redirect light from the light source. Without the edge features, a person looking at the lighting assembly is likely to perceive spatial variations in the color of light that is emitted from the light guide of the lighting assembly.

Figure 1:
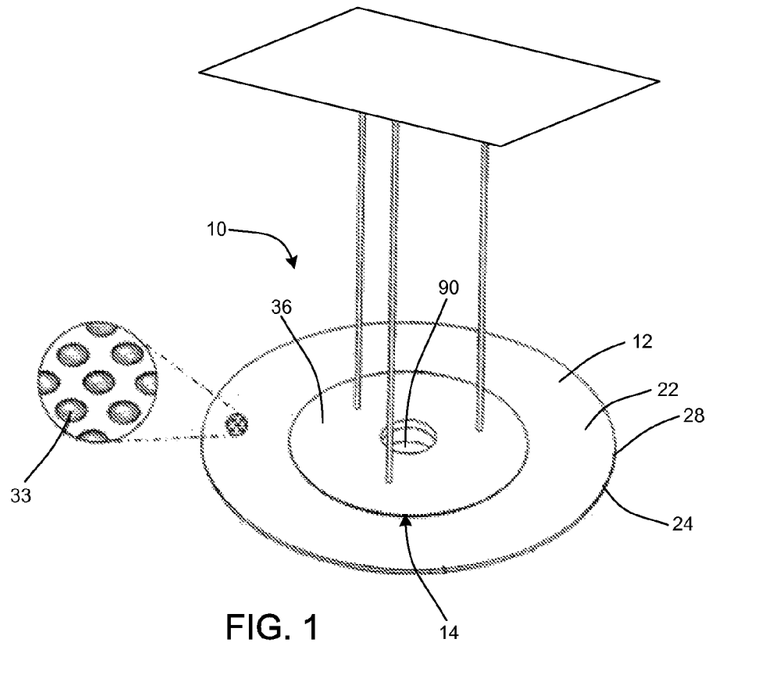
FIG. 1 is a perspective view of a lighting assembly having a light guide without light-redirecting edge features on its light input edge.
Figure 2:
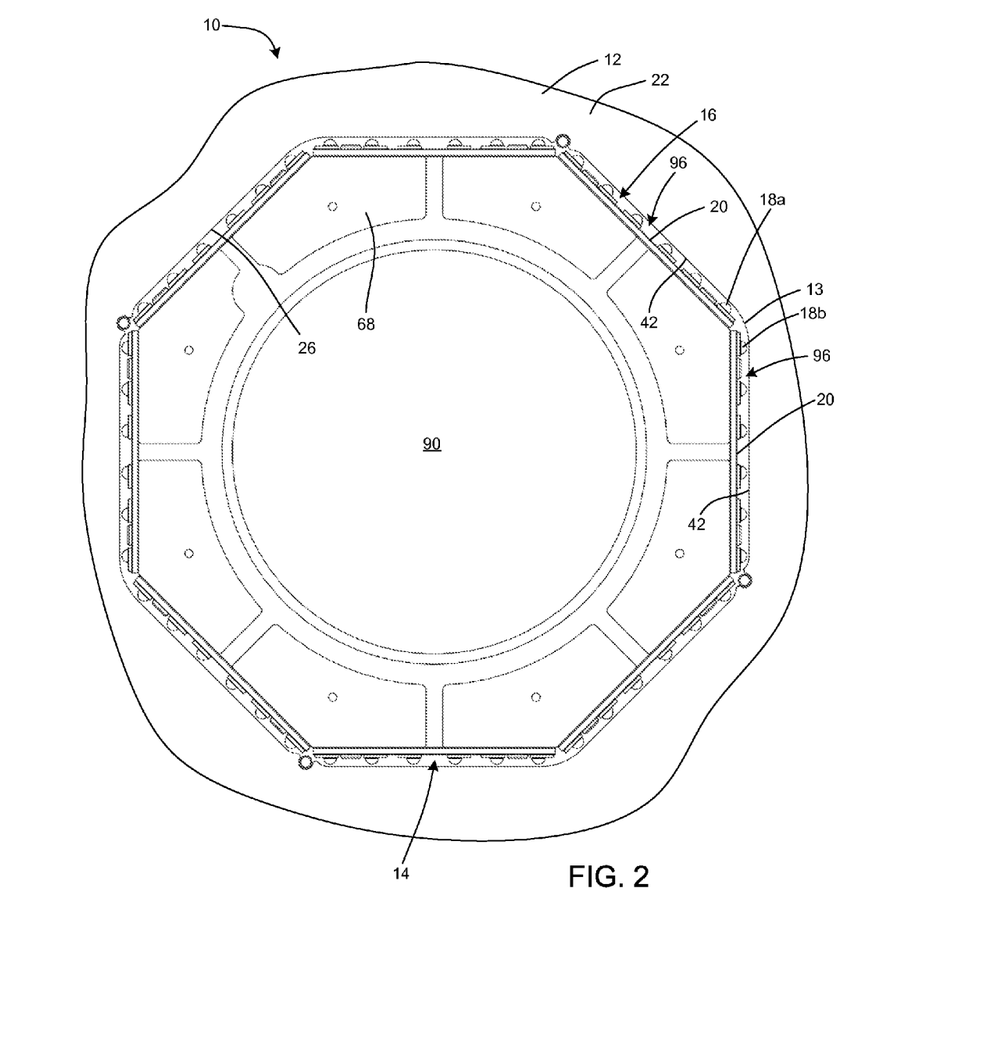
FIG. 2 is a plan view of the lighting assembly of FIG. 1 with a cover of a light engine removed and part of the light guide cut away.

FIGS. 1 and 2 show a lighting assembly 10 having a light guide 12 without light-redirecting edge features on the light input edge of the light guide 12. Examples of such lighting assemblies are disclosed in U.S. patent application Ser. No. 13/440,197. Lighting assembly 10 includes the light guide 12 and a light engine 14. Light engine 14 includes a light source assembly 16. Light source assembly 16 includes one or more light sources 18. In the example shown, light sources 18 are mounted to a printed circuit board (PCB) 20. Reference numeral 18 will be generally used to collectively refer to the light sources and reference numeral 18 followed by a letter (e.g., 18a or 18b) will be used to refer to a specific light source.

Light sources 18 are light-emitting diodes (LEDs) that generate light whose color depends on the angle at which the light is emitted from the LED. The LEDs may be top-fire LEDs or side-fire LEDs. The LEDs are broad spectrum LEDs that include a wavelength-converting material, such as a phosphor, to convert short-wavelength light from a semiconductor die to light of a longer wavelength. An LED that generates white light is an example of such an LED. Light source assembly 16 may additionally include circuitry, power supply and/or electronics for controlling and driving the light sources 18, and any other appropriate components, none of which is shown. The light engine 14 includes a heat sink 68 to dissipate heat generated by the light sources 18. In the illustrated embodiment, the heat sink 68 also serves as an armature that retains the light source assembly 16.

Light from light sources 18 is input into light guide 12. Light guide 12 is a solid article made from, for example, acrylic, polycarbonate, glass, or another appropriate material. Light guide 12 also may be a multi-layer light guide having two or more layers. Light guide 12 has opposed major surfaces 22 and 24. Depending on the configuration of light guide 12, the light guide has at least one edge. For instance, in the illustrated embodiment where light guide 12 is shaped like a disk, light guide 12 has two opposed edges 26 and 28. Other light guide 12 shapes are possible, such as a dome, a globe, a shape approximating the bulbous shape of a conventional incandescent bulb, a frustoconical shape, a frustrated pyramid shape, or another similar shape. Other shapes that surround the light engine 14 are possible, such as a square, a rectangle, an oval, a triangle, a regular or irregular polygon, another geometric shape, or a non-geometrical shape. The illustrated light guide 12 is planar, but the light guide 12 may be curved (e.g., dome-shaped, frustoconical, etc.). Other geometries for the light guide 12 result in a corresponding number of edges. Depending on the geometry of the light guide 12, each edge may be straight or curved, and adjacent edges may meet at a vertex or join in a curve.

One of the edges of light guide 12 serves as a light input edge 26. In the lighting assembly 10 illustrated at FIGS. 1 and 2, the light input edge 26 is an internal edge of the light guide 12. A hole 90 in the light guide 12 defines the light input edge 26. Light output from the light source 18 is directed toward the light input edge 26. Once input into the light guide 12 through the light input edge 26, the light propagates within the light guide 12 by total internal reflection (TIR) at the opposed major surfaces 22, 24. Depending on the geometry of the light guide 12, the light input edge 26 may be straight, polygonal, or curved, and adjacent light input edge segments 42 of the light input edge 42 may meet at a vertex 13. As shown in FIG. 2, the vertex 13 may be curved. As will be discussed in more detail below, light sources 18 adjacent one another on respective sides of a vertex 13 have diverging optical axes (as defined below). This arrangement of the light sources contributes to the output of light that is observably non-uniform in color as a function of location on the light guide 12.

Length and width dimensions of each of the major surfaces 22, 24 are much greater than, typically ten or more times greater than, the thickness of the light guide 12. The thickness is the dimension of the light guide 12 in a direction orthogonal to the major surfaces. The thickness of the light guide 12 may be, for example, about 0.1 millimeters (mm) to about 10 mm. The light guide 12 may be rigid or flexible.

The light guide 12 includes light-extracting elements 33, an exemplary one of which is light-extracting element 33 (FIG. 1), in, on, or beneath at least one of the major surfaces 22, 24. Throughout this disclosure reference number 33 is used to refer to light-extracting element 33 individually as well as to light-extracting elements collectively. Light-extracting elements 33 that are in, on, or beneath a major surface 22, 24 will be referred to as being "at" the major surface 22, 24. Each light-extracting element 33 functions to disrupt the total internal reflection of the propagating light that is incident on the light-extracting element 33. In one embodiment, the light-extracting elements 33 reflect light toward the opposed major surface so that the light exits the light guide 12 through the opposing major surface. Alternatively, the light-extracting elements 33 transmit light through the light-extracting elements 33 and out of the major surface 22, 24 of the light guide 12 having the light-extracting elements 33. In another embodiment, both types of light-extracting elements 33 are present. In yet another embodiment, the light-extracting elements 33 reflect some of the light and refract the remainder of the light incident thereon. Therefore, the light-extracting elements 33 are configured to extract light from the light guide 12 through one or both of the major surfaces 22, 24. The light-extracting elements 33 may be arranged to output light over part or all of one or both of the major surfaces 22, 24.

Light guides having light-extracting elements 33 are typically formed by a process such as injection molding. The light-extracting elements 33 are typically defined in a shim or insert used for molding light guides by a process such as diamond machining, laser etching, laser micromachining, chemical etching, or photolithography. Alternatively, any of the above-mentioned processes may be used to define the light-extracting elements 33 in a master that is used to make the shim or insert. In other embodiments, light guides without light-extracting elements 33 are typically formed by a process such as injection molding or extruding, and the light-extracting elements 33 are subsequently formed on one or both of the major surfaces 22, 24 by a process such as stamping, embossing, or laser etching, or another suitable process. Light-extracting elements 33 may also be produced by depositing elements of curable material on the major surfaces 22, 24 of the light guide 12 and curing the deposited material using heat, UV-light, or other radiation. The curable material can be deposited by a process such as printing, ink jet printing, screen printing, or another suitable process. Alternatively, the light-extracting elements 33 may be inside the light guide between the major surfaces 22, 24 (e.g., the light-extracting elements 33 may be light redirecting particles and/or voids disposed within the light guide).

The light-extracting elements 33 are configured to extract light in a defined intensity profile, such as a uniform intensity profile, over the relevant major surface 22, 24 and/or to extract light in a defined light ray angle distribution. Using variations in the light-extracting elements 33, the major surfaces 22, 24, or portions thereof, can have different intensity profiles and/or light ray angle distributions. Intensity profile refers to the variation of intensity with position within a light-emitting region (such as the area of the major surface 22, 24 from which light is emitted). Light ray angle distribution refers to the variation of intensity with ray angle (typically a solid angle) of light emitted from a light-emitting region (such as the area of the major surface 22, 24 from which light is emitted).

Exemplary light-extracting elements 33 include light-scattering elements, which are typically features of indistinct shape or surface texture, such as printed features, ink-jet printed features, selectively-deposited features, chemically etched features, laser etched features, and so forth. Other exemplary light-extracting elements 33 include features of well-defined shape, such as V-grooves, lenticular grooves, and features of well-defined shape that are small relative to the linear dimensions of the major surfaces 22, 24, which are referred to herein as micro-optical elements. The smaller of the length and width of a micro-optical element is less than one-tenth of the largest surface dimension of the light guide 12, and the larger of the length and width of the micro-optical element is less than one-half of the smallest surface dimension of the light guide 12. The length and width of the micro-optical element are measured in a plane parallel to the major surface 22, 24 of the light guide 12 for flat light guides 12 or along a surface contour for non-flat light guides 12.

Micro-optical elements are shaped to predictably reflect light or predictably refract light. However, one or more of the surfaces of the micro-optical elements may be modified, such as roughened, to produce a secondary effect on light output. Exemplary micro-optical elements are described in U.S. Pat. No. 6,752,505 and, for the sake of brevity, will not be described in detail in this disclosure. The micro-optical elements may vary in one or more of size, shape, depth or height, density, orientation, slope angle, or index of refraction such that a desired light output from the light guide 12 is achieved over the corresponding major surface 22, 24.

The lighting assembly 10 is shown in FIG. 2 with the cover 36 of the light engine removed and the outer portion of the light guide 12 cut away. The lighting assembly 10 includes multiple light sources 18. In particular, the lighting assembly 10 includes light sources, for example 18a and 18b, that are adjacent one another, but are arranged with their optical axes (as defined below) diverging. In the example shown in FIG. 2, the optical axes of the light sources 18a, 18b diverge as a result of light sources 18a, 18b being respective parts of different light source segments 96. The optical axes of the light sources 18a, 18b also diverge when, for example, light sources 18a and 18b are parts of an arcuate light source segment. Each of the light sources 18a, 18b emits respective light that, as will be described in detail below with reference to FIGS. 3 and 4, varies in color depending on the angle relative to the light source. The variation in color with angle of the light gives rise to spatial variations in the color of the light extracted from the light guide 12, as will also be described below.

Figure 3:
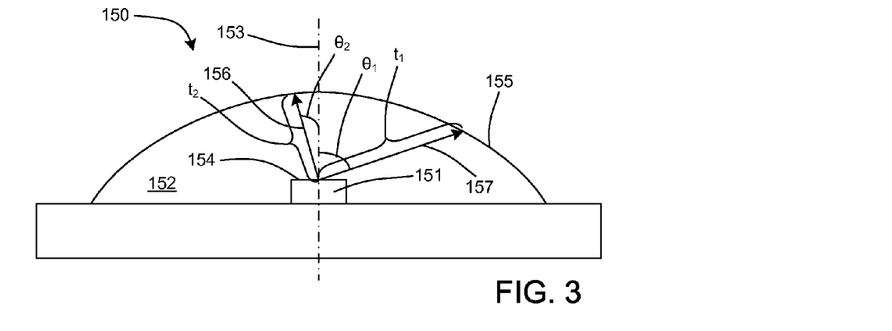
FIG. 3 is a sectional view of an exemplary dome-shaped light-emitting diode (LED) that may be used as a light source for a lighting assembly.
Figure 4:
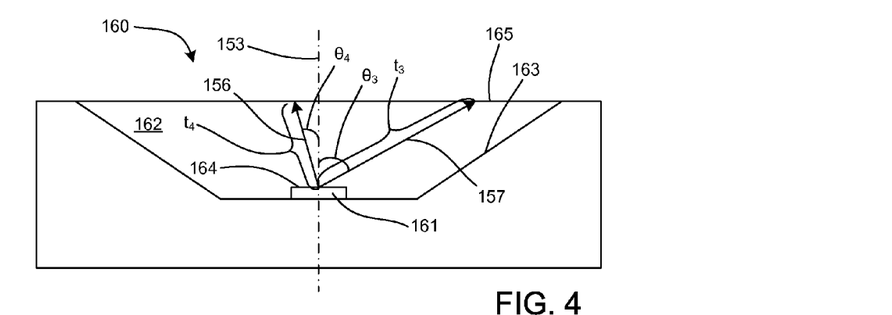
FIG. 4 is a sectional view of an exemplary cavity reflector-type LED that may be used as a light source for a lighting assembly.

FIGS. 3 and 4 show examples of LEDs 150 and 160, respectively, suitable for use as the light sources 18 and as part of a light source segment 96 in the lighting assemblies described herein. Referring to FIG. 3, the LED 150 includes a semiconductor die 151 encapsulated by an encapsulant 152 shaped to form a lens. The encapsulant 152 includes a phosphor or other wavelength-converting material that converts the short-wavelength light generated by the semiconductor die 151 to light of a longer wavelength. In an example, the LED 150 emits substantially white light. For example, an encapsulant containing a single broad-spectrum yellow phosphor or a combination of a green phosphor and a red phosphor will produce white light from blue light emitted by the semiconductor die 151. Other combinations of the color of light generated by the semiconductor die 151 and the color of light to which part of the light is converted by the phosphor may be used to generate light of different colors. Wavelength converting materials other than phosphors may additionally or alternatively be used to convert at least part of the light emitted by the semiconductor die 151 to longer-wavelength light (e.g., a luminescent material, a luminescent nanomaterial such as a quantum dot material, a conjugated polymer material, an organic fluorescent dye, an organic phosphorescent dye, lanthanide-doped garnet, or the like.).

The color of the light emitted by the LED 150 changes with the angle relative to the optical axis 153 of the LED 150 at which the light is emitted from the LED. The optical axis 153 is defined as an axis extending orthogonally from the center of the light emitting surface 154 of the LED die 151. In the example shown in FIG. 3, the LED 150 is a dome-shaped LED with a dome-shaped encapsulant 152. The path of a light ray through the phosphor-doped encapsulant has a minimum length along the optical axis 153 and increases in length with increasing angle relative to the optical axis 153. For example, the path length $t_1$ from the light emitting surface 154 at an angle $\theta_1$ to the outer surface 155 of the encapsulant 152 is larger than the path length $t_2$ from the light emitting surface 154 at an angle $\theta_2$, smaller than the angle $\theta_1$, to the outer surface 155 of the encapsulant 152. Light rays emitted at smaller angles relative to the optical axis 153 are referred to herein as on-axis light rays. Exemplary on-axis light rays are shown at 156, and reference numeral 156 is additionally used to refer to on-axis light rays collectively. Light rays emitted at larger angles relative to the optical axis 153 are referred to herein as off-axis light rays. Exemplary off-axis light rays are shown at 157, and reference numeral 157 is additionally used to refer to off-axis light rays collectively. As used in this disclosure, the terms on-axis light rays and off-axis light rays are used in a relative sense: on-axis light rays 156 propagate at smaller angles relative to the optical axis 153 than off-axis light rays 157, but only a small fraction of the on-axis light rays propagate along the optical axis 153 itself.

On-axis light rays 156 have a shorter path length through the phosphor-doped encapsulant 152 than off-axis light rays 157. As a result, after passing through the phosphor-doped encapsulant 152, on-axis light rays 156 differ in spectrum from off-axis light rays 157 (i.e., the on-axis light rays 156 differ from the off-axis light rays 157 in color once they have traveled through the encapsulant 152 since the off-axis light rays 157 have a greater probability of being absorbed and re-emitted by the phosphor disposed in the encapsulant due to the longer path of travel through the encapsulant). Typically, the off-axis light rays 157 appear yellower than the on-axis light rays 156 or the on-axis light rays 156 appear bluer than the off-axis light rays 157.

FIG. 4 shows another example 160 of an LED suitable for use as a respective one of the light sources 18 and as part of a light source segment 96. LED 160 includes a semiconductor die 161 encapsulated by an encapsulant 162. In one embodiment, the encapsulant 162 includes a phosphor or other wavelength-converting material that converts short-wavelength light generated by the semiconductor die 161 to light of a longer wavelength. In an example, the LED 160 emits substantially white light. The encapsulant 162 is phosphor-doped and the color of the light emitted by the LED 160 changes with the angle relative to the optical axis 153 at which the light is emitted from the LED. The optical axis 153 is defined as an axis extending orthogonally from the center of the light emitting surface 164 of the LED die 161. In the embodiment of FIG. 4, the LED 160 is a reflector-cup-type LED with a cup-shaped reflector 163 at the bottom of which is mounted semiconductor die 161. The remainder of the reflector cup 163 is filled with encapsulant 162. The path through the phosphor-doped encapsulant has a minimum length along the optical axis 153 and increases in length with increasing angle relative to the optical axis 153. For example, at relatively large angle $\theta_3$ relative to optical axis 153, the path length $t_3$ from the emitting surface 164 to the outer surface 165 of the encapsulant 162 is larger than the path length $t_4$ at relatively small angle $\theta_4$ from the emitting surface 164 to the outer surface 165 of the encapsulant 162.

On-axis light rays 156 emitted at relatively small angles to the optical axis 153 have a shorter optical path through the phosphor-doped encapsulant 162 than off-axis light rays 157 emitted at relatively larger angles to the optical axis 153. As a result, after passing through the phosphor-doped encapsulant 162, on-axis light rays 156 differ in spectrum from off-axis light rays 157 (i.e., the on-axis light rays 156 differ in color from the off-axis light rays 157 once they have traveled through the encapsulant 162). Typically, the off-axis light rays 157 appear yellower than the on-axis light rays 156 or the on-axis light rays 156 appear bluer than the off-axis light rays 157.

In the example of lighting assembly 10 described above with reference to FIGS. 1 and 2, each of the light input edge segments 42 of light input edge 26 is a planar surface oriented orthogonally to the optical axes of the light sources 18 located adjacent thereto.

Figure 5:
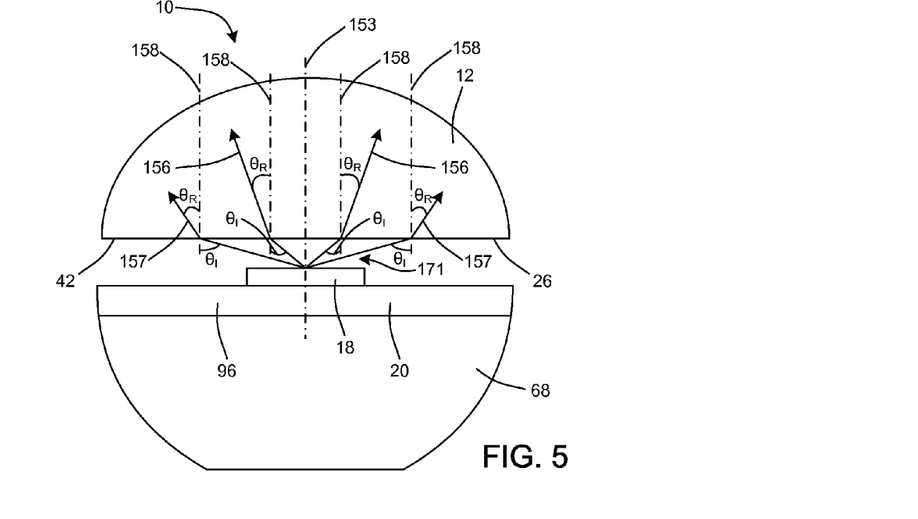
FIG. 5 is a plan view showing how on-axis light rays and off-axis light rays propagate in the lighting assembly of FIGS. 1 and 2.

FIG. 5 shows a portion of lighting assembly 10. The portion of lighting assembly 10 shown includes a portion of a light source segment 96 and a corresponding portion of the light input edge segment 42 of the light input edge 26 of the light guide 12 located opposite the light source segment 96. As noted above, light input edge segment 42 is a planar light input edge segment and lacks any light-redirecting edge feature such as one of the light-redirecting edge features described below. The portion of light source segment 96 shown includes a light source 18. In the example shown, light source 18 is a reflector-cup-type LED similar to reflector-cup-type LED 160 described above with reference to FIG. 4 and has an optical axis 153. Light source 18 is mounted with its optical axis 153 orthogonal to planar light input edge segment 42. Therefore, the optical axis 153 is parallel to normal 158 relative to the light input edge segment 42.

Refraction at the light input edge segment 42 changes the respective angles relative to the light input edge segment 42 at which on-axis light rays 156 and off-axis light rays 157 output by the light source 18 propagate within the light guide 12. The change in the respective angles of propagation is toward the normal 158 relative to the light input edge segment 42. The angle at which the light rays propagate within the light guide 12 (i.e., the angle of refraction $\theta_R$) is determined by the ratio of the indices of refraction of the light guide 12 and the material (typically air) in the gap 171 between the light source 18 and the light input edge segment 42, and the angle of incidence $\theta_I$ of the light rays on the light input edge segment (known as Snell's Law). As noted above, all angles of incidence, refraction, reflection and propagation are measured relative to the normal to the surface, in this case, relative to the normal 158 to the light input edge segment 42. The light emitted from the light source 18 propagates in the gap 171 within a range of angles of approximately ±90°. Upon refraction at light input edge segment 42, the light propagates within the light guide 12 within a range of angles of approximately ±42° for a typical material for the light guide 12. However, off-axis light rays 157 still propagate within light guide 12 at larger angles relative to the normal 158 than on-axis light rays 156, and thus remain angularly and spatially separated from on-axis light rays 156 as the light rays propagate within the light guide.

Figure 6A:
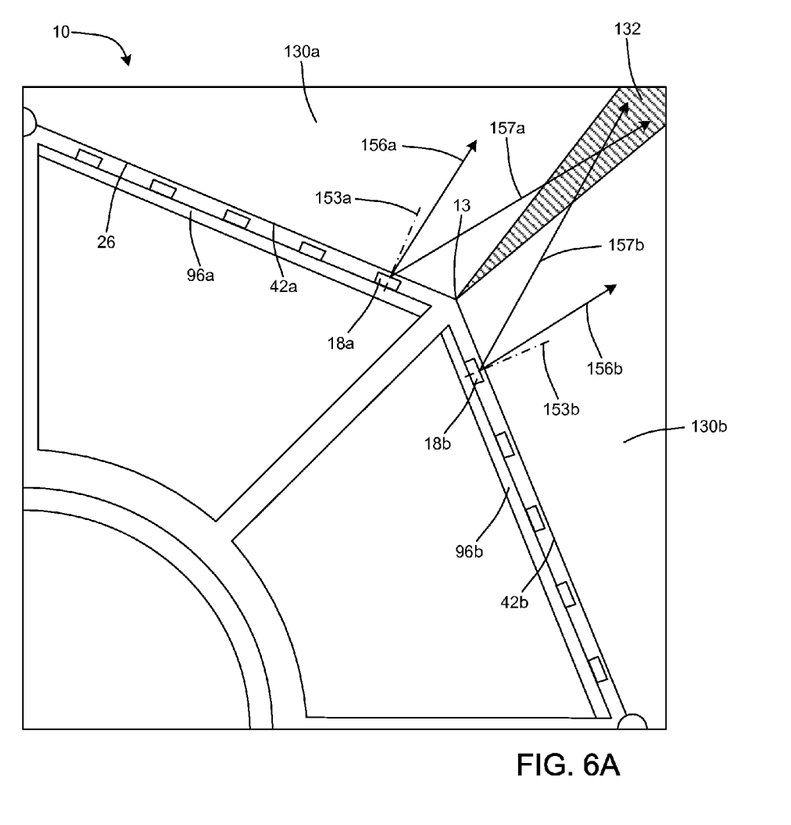
FIG. 6A is a plan view of a portion of a lighting assembly, including portions of two adjacent light source segments and portions of corresponding light input edge segments of the light guide and showing spatial variation in the color of light output.

FIG. 6A shows a portion of the lighting assembly 10 including two adjacent light source segments 96a, 96b and corresponding light input edge segments 42a, 42b of light guide 12. FIG. 6A illustrates how the spatial separation between the on-axis light rays and the off-axis light rays propagating within the light guide (the off-axis light rays 157 propagating within light guide 12 at larger angles relative to the normal to the planar light input edge segment 42 than on-axis light rays 156) causes perceptible spatial color variations in the light extracted from the light guide 12 when edge features according to this disclosure are not present. As used herein, the term spatial color variation refers to the variation of the color of the light extracted from the light guide with respect to position on the light guide 12.

FIG. 6A shows light sources 18a, 18b that are adjacent one another, but are mounted non-parallel to one another such that their optical axes 153a, 153b diverge. The light sources 18a and 18b, as well as the other light sources 18 of the light engine 14, are nominally of the same construction and have pump light sources. That is, the light sources 18 include the same type of LED (e.g., LED 150 or LED 160). In this case, the LED die 151 or 161 for each light source is of the same construction. For instance, each die emits blue light of a particular wavelength range. The blue light is sometimes referred to as "pump light" since the light excites the photoluminescence of the phosphor which is adjacent thereto. Also, the same type of phosphor in the same configuration is used in each encapsulant 152 or 162. That is, the encapsulant for each light source includes, for example, yellow phosphor of a certain composition such that it has certain photoabsorption and photoluminescence characteristics. Also, the encapsulant for each light source is applied to the respective LED die with nominally the same thickness and phosphor dilution in a diluent to achieve a certain optical density and photoluminescence efficiency from the light sources. As a result, the light sources 18 are nominally identical in color. But, in reality, differences of color are observable in the light that is output from the light guide 12 as explained in this specification. In other embodiments, wavelength-converting materials other than phosphors are used.

In the example shown in FIG. 6A, the light input edge 26 of light guide 12 is polygonal and the light sources 18a, 18b are located to either side of vertex 13 between light input edge segments 42a, 42b. This arrangement causes off-axis light rays 157a, 157b to predominate in the light propagating within a minor sector 132 of light guide 12.

Figure 6B:
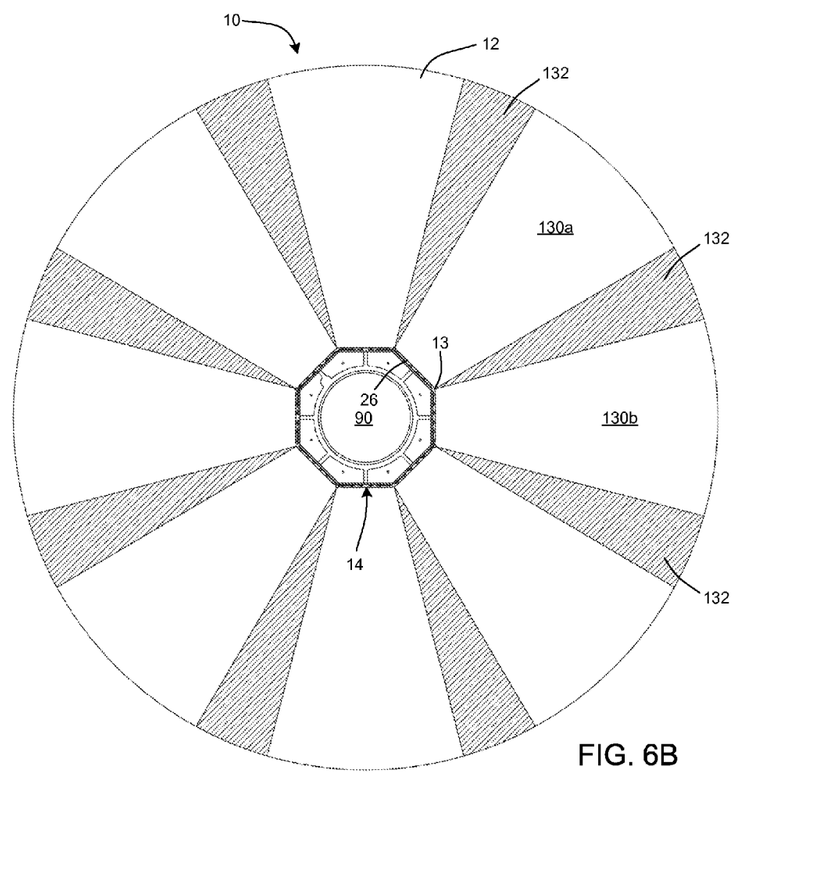
FIG. 6B is a plan view of a lighting assembly with the cover of the light engine removed and showing spatial variation in the color of light output.

FIG. 6B is a plan view showing lighting assembly 10 and depicts a respective minor sector 132 of light guide 12 extending radially outwards from each vertex 13 of light input edge 26, and a respective major sector 130 of light guide 12 extending radially outwards from each light input edge segment 42. As described above, off-axis light rays 157 differ in color from on-axis light rays 156. As a result, when edge features are not present (e.g., the light input edge 26 is planar in front of each respective light source 18 as shown in FIG. 5) the light extracted from the minor sectors 132 of light guide 12 differs in color from the light extracted from the major sectors 130. Typically, the light extracted from minor sectors 132 is yellower than the light extracted from major sectors 130 or the light extracted from major sectors 130 is bluer than the light extracted from minor sectors 132.

Figure 7A:
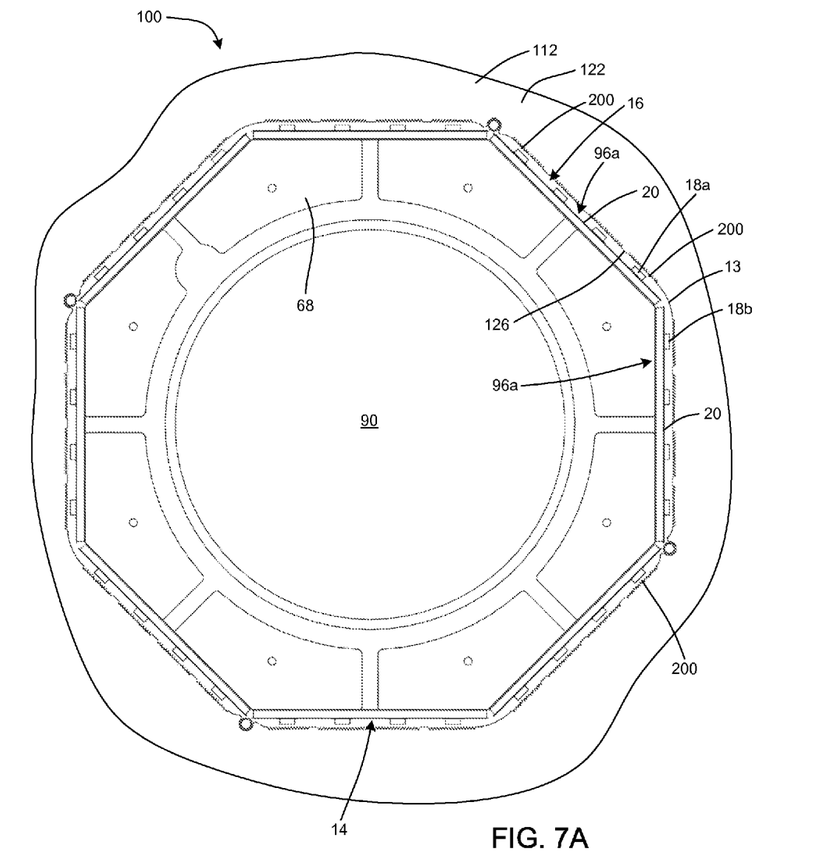
FIG. 7A is a plan view of a part of an exemplary lighting assembly having light-redirecting edge features on the light input edge of a light guide.
Figure 7B:
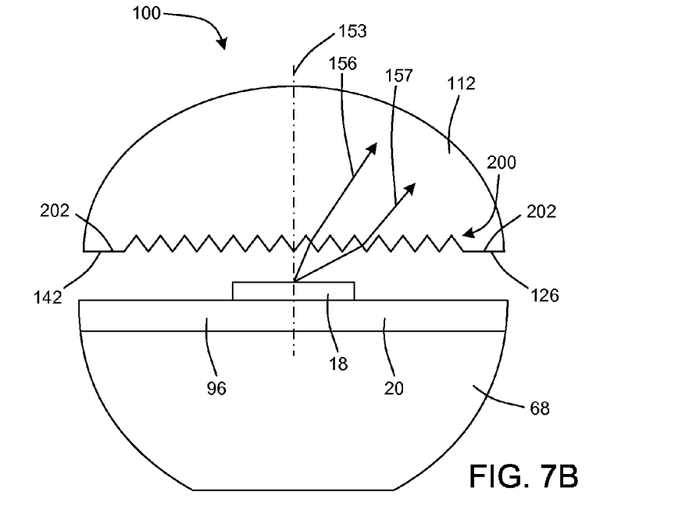
FIG. 7B is a plan view of a portion of the view of FIG. 7A.

Spatial color variations in the light extracted from different sectors of light guide 12 are aesthetically undesirable in some applications. With additional reference to FIGS. 7A and 7B shown are parts of an exemplary lighting assembly 100 that includes light-redirecting edge features 200 to reduce or eliminate spatial color variations by improving the mixing of on-axis light rays 156 and off-axis light rays 157. Elements of lighting assembly 100 that correspond to elements of the above-described lighting assembly 10 are indicated by the same reference numerals and will not be described again in detail.

In lighting assembly 100, at least two adjacent ones of the light input edge segments 142 of the light input edge 126 of the light guide 112 respectively includes at least one light-redirecting edge feature 200. The general function of the light-redirecting edge features 200 is to specularly redirect the on-axis light rays 156 and the off-axis light rays 157 in a way that increases the angles at which the light rays propagate in the light guide 112. Other than the light guide 112 having light-redirecting edge features 200, the lighting assembly 100 is similar to lighting assembly 10 and common features will not be further described.

In a typical embodiment, light redirecting edge feature 200 changes the respective angles at which the on-axis light rays 156 and the off-axis light rays 157 propagate within the light guide 12 such that at least some of the on-axis light rays 156 emitted by first light source 18a and at least some of the off-axis light rays 157 emitted by second light source 18b overlap within light guide 112 (the light sources 18a and 18b being of the same nominal construction as explained above). Similarly, at least some of the on-axis light rays 156 emitted by second light source 18b and at least some of the off-axis light rays 157 emitted by first light source 18a overlap within light guide 112. The increased overlap between on-axis light rays 156 and off-axis light rays 157 decreases spatial variations in the color of the light propagating within the light guide. As a result, there is also a decrease in spatial color variations in the light extracted from the light guide 112. In particular, the increased overlap decreases color differences between the light extracted from the above-described major sectors 130 of the light guide and the light extracted from the above-described minor sectors 132 of the light guide.

In some embodiments, light-redirecting edge feature 200 increases the angles at which on-axis light rays 156 propagate within light guide 112 to a greater extent than it increases the angles at which off-axis light rays 157 propagate within the light guide to increase the overlap between the on-axis light rays 156 and the off-axis light rays 157. In other embodiments, light-redirecting edge feature 200 decrease the angles at which off-axis light rays 157 propagate within light guide 112 to a greater extent than it decreases the angles at which on-axis light rays 156 propagate within the light guide to increase the overlap between the on-axis light rays 156 and the off-axis light rays 157. In yet other embodiments, light-redirecting edge feature 200 increases the angles at which on-axis light rays 156 propagate within light guide 112 and decreases the angles at which off-axis light rays 157 propagate within the light guide to increase the overlap between the on-axis light rays and the off-axis light rays 157. In some embodiments, light-redirecting edge feature 200 leaves the angles at which one of the on-axis light rays or the off-axis light rays propagate substantially unchanged.

In some embodiments, the spatial color variation is considered to be satisfactorily decreased when color variations between different regions of light guide 112 are indiscernible to the human eye. In other embodiments, other ways, e.g., colorimetric ways, of determining a satisfactory reduction in spatial color variation are used.

To provide the above-described changes in the angles at which on-axis light rays 156 and/or off-axis light rays 157 propagate within light guide 112, each light input edge segment 142 of the light guide 112 includes a light-redirecting edge feature 200 opposite each light source 18 to receive light from the light source 18. Referring additionally to FIG. 5, on-axis light rays 156 and off-axis light rays 157 emitted by light source 18 are incident on the light input edge segment 42 of the light guide 12 at locations having different lateral offsets from the optical axis 153 of the light source 18. The lateral direction is a direction orthogonal to the optical axis 153 and parallel to the major surfaces 22, 24 of light guide 12 at the light input edge segment 42.

Light-redirecting edge feature 200 is structured to have a specular light-redirecting property that differs from that of planar, orthogonally-oriented light input edge segment 42 depending on lateral distance from the optical axis 153 of light source 18 when the light source is in its nominal location relative to the light input edge segment. In typical embodiments, the light-redirecting edge features 200 are configured to alter the angles at which one or both the on-axis light rays and the off-axis light rays propagate within light guide 112 so that light from adjacent light sources 18*a*, 18*b* having diverging optical axes 153 overlaps in the minor sectors 132 of light guide 112. This allows light of different spectra to mix in the light guide and gain a more uniform appearance in color when extracted.

In one embodiment, the light redirecting properties of edge feature 200 differ between an on-axis region of edge feature 200 on which predominantly on-axis light rays 156 are incident and off-axis regions on which predominantly off-axis light rays 157 are incident. The location-dependent light-redirecting properties of the edge feature 200, compared to the light-redirecting properties of a planar, orthogonally-oriented light input edge segment 42 (FIG. 5), changes the respective angles at which on-axis light rays 156 and off-axis light rays 157 propagate within light guide 112 in a way that increases overlap between the on-axis light rays 156 emitted by light source 18*a* (FIG. 7A) and the off-axis light rays 157 emitted by light source 18*b* within the light guide 112 (FIG. 7A). Additionally or alternatively, the location-dependent light-redirecting properties of edge feature 200, compared to the light redirecting properties of a planar, orthogonally-oriented light input edge segment 42, changes the angles at which on-axis light rays 156 and off-axis light rays 157 propagate within light guide 112 in a way that increase overlap between the off-axis light rays 157 emitted by first light source 18*a* and the on-axis light rays 156 emitted by light source 18*b* overlap within the light guide 112. Additionally or alternatively, the location-dependent light-redirecting properties of edge feature 200, compared to the light redirecting properties of a planar, orthogonally-oriented light input edge segment 42, changes the angles at which on-axis light rays 156 and off-axis light rays 157 propagate within light guide 112 in a way that increases overlap between the on-axis light rays 156 and the off-axis light rays 157 emitted by the same light source 18 within the light guide 112.

In the illustrated embodiment of FIGS. 7A and 7B, the light-redirecting edge features 200 are V-grooves (also referred to as prismatic grooves) that are arrayed in the lateral direction at the light input edge 126 of the light guide 112. The V-grooves are oriented to extend in a direction orthogonal to the planes of the major surfaces 22, 24 and extend from the first major surface 22 to the second major surface 24. The V-grooves of each light-redirecting edge feature 200 are positioned opposite a respective one of the light sources 18. Each light-redirecting edge feature 200 on a light input edge segment 142 is spaced apart from neighboring light-redirecting edge features 200 by a planar portion 202 of the light input edge segment.

As light from the light source 18 is incident on the V-grooves of the light-redirecting edge feature 200 opposing the light source 18, the light is specularly refracted and enters the light guide 112. Compared to a planar, orthogonally-oriented light input edge segment 42 (FIG. 5), the on-axis light rays 156 of this embodiment have a higher angle of propagation and the off-axis light rays 157 have a smaller angle of propagation.

Figure 8A:
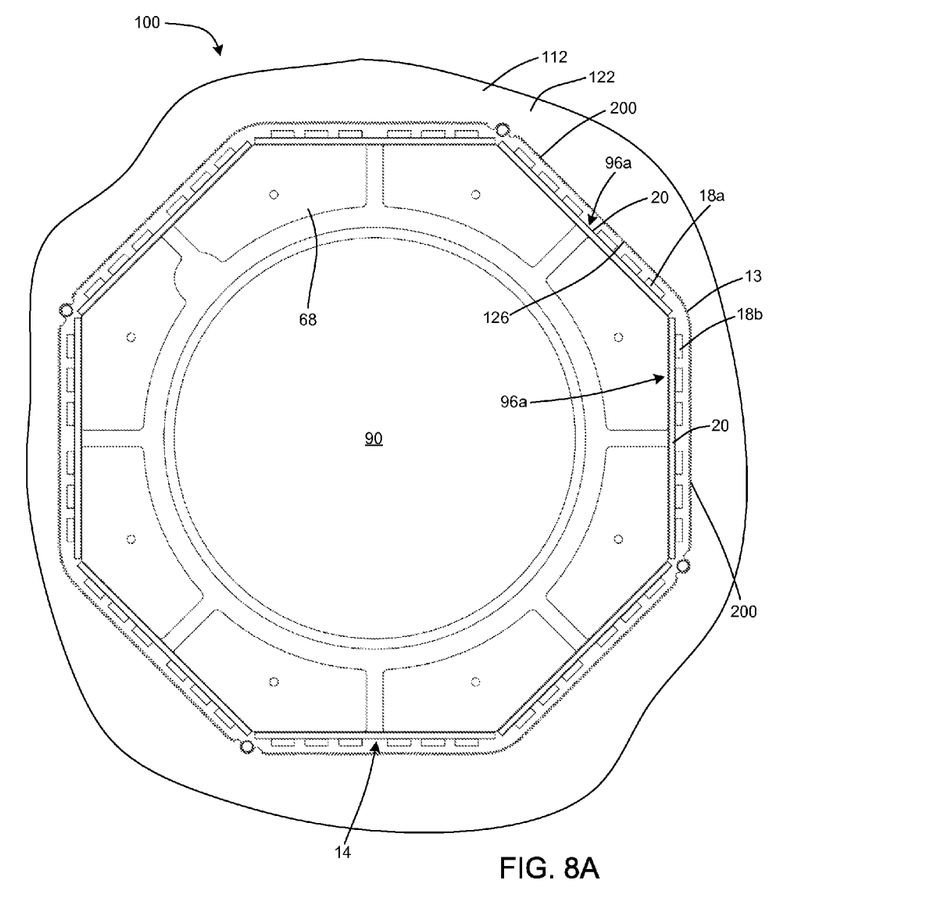
FIG. 8A is a plan view of a part of another exemplary lighting assembly having light-redirecting edge features on the light input edge of a light guide.
Figure 8B:
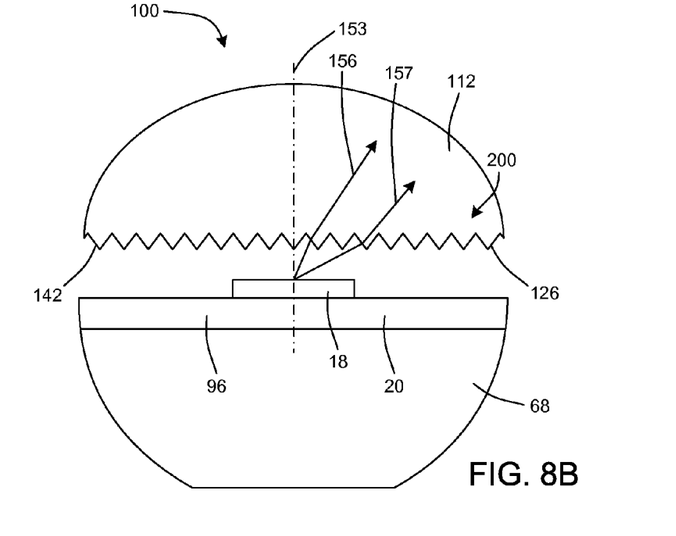
FIG. 8B is a plan view of a portion of the view of FIG. 8A.

FIGS. 8A and 8B show another example of lighting assembly 100 in which light input edge segments 142 each include a light-redirecting edge feature 200 opposite the light sources 18 to receive and specularly refract the light therefrom. Similar to the embodiment of FIGS. 7A and 7B, the light-redirecting edge feature 200 comprises V-grooves. But, in the embodiment of FIGS. 8A and 8B, there are not discrete light-redirecting features 200 for each light source 18 that are separated by planar portions 202. Rather, the light redirecting feature 200 is contiguous along each light input edge segment 142.

In the embodiments of FIGS. 7A, 7B, 8A and 8B, the V-grooves are uniform in that the V-grooves have a uniform pitch, and each V-groove is symmetrical and has the same apex angles as the other V-grooves in the light-redirecting feature 200. Other arrangements of V-grooves or elongated triangular features that make up the light-redirecting features 200 are possible. With additional reference to FIG. 9A, a light source 18 and another embodiment of a symmetrical light-redirecting feature 200 is shown. This light-redirecting feature 200 has a composite of triangular features, including a central on-axis section 204 of symmetrical V-grooves to refract on-axis light rays 156. The central section 204 is interposed between a pair of off-axis sections 206*a* and 206*b* symmetrical about the optical axis 153 that refract off-axis light rays 157. Each lateral section 206 of the light-redirecting feature 200 includes a sawtooth arrangement of skewed triangular (prismatic) features. Each skewed triangular feature has a light entrance surface 208 that is angled to face the light source 18 and a rear surface 210 that is angled closer to normal to the light input edge segment 142 than the light entrance surface 208. In one embodiment, the rear surface 210 is oriented orthogonally to the light input edge segment 142. In other examples (not shown), in at least one of sections 206a, 206b, the rear surfaces 210 are oriented relative to light input edge segment 142 at non-orthogonal angles.

Figure 9A:
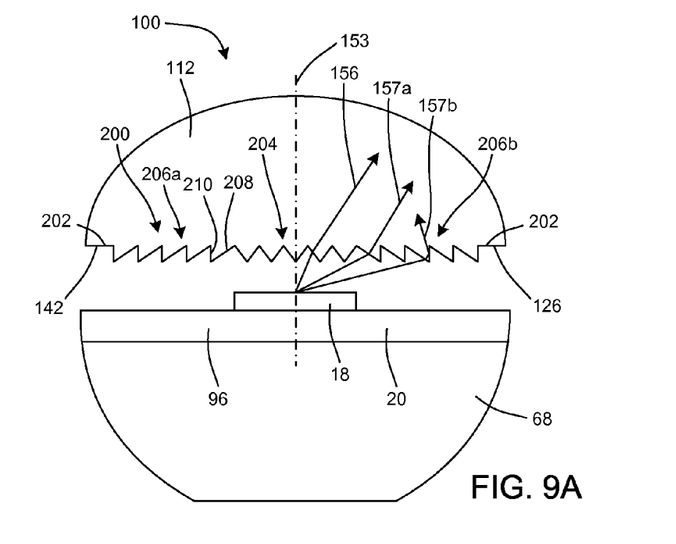
FIG. 9A is a plan view of a part of another exemplary lighting assembly having light redirecting edge features on the light input edge of a light guide.

Some off-axis light rays (e.g., ray 157a) are refracted at a light entrance surface 208 and propagate in the light guide 112 in the refracted direction. Other, higher angle, off-axis light rays (e.g., ray 157b) are refracted at the a light entrance surface 208 and are incident on a respective rear surface 210 where the light ray is reflected by total internal reflection. The light ray then propagates in the light guide 112 in the direction of travel after reflection at the rear surface 210. In one embodiment, the rear surfaces 210 are coated with a reflective coating.

The on-axis rays 156 incident on the triangular features of the central section 204 are refracted away from the optical axis 153. This increases the overlap between the off-axis light rays 157 and the on-axis light rays 156 generated by light source 18, and reduces spatial color variations in the light extracted from light guide 112. The apex angle of the triangular features of the central section 204 and the apex angle of the sawtooth features of the lateral sections 206a, 206b are typically different. The refractive light entrance surfaces 208 in each lateral section 206a, 206b may vary in angle relative to the optical axis 153 as a function of lateral distance from the optical axis 153.

Figure 9B:
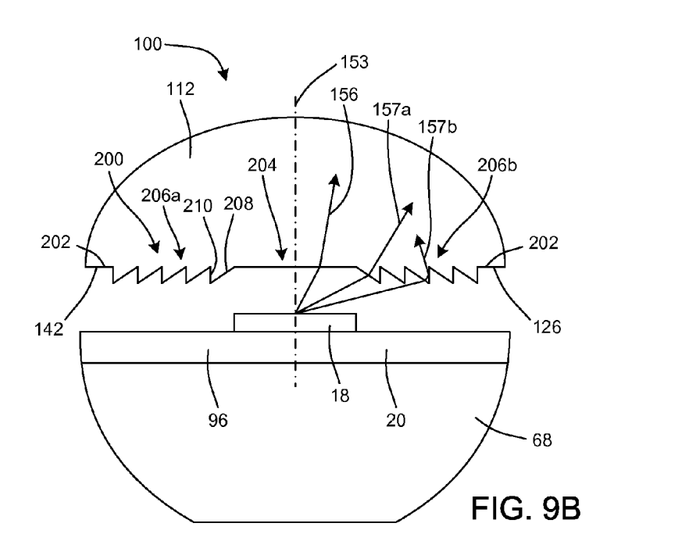
FIG. 9B is a plan view of a part of another exemplary lighting assembly having light redirecting edge features on the light input edge of a light guide.

FIG. 9B shows another embodiment of a composite light-redirecting feature 200. In this embodiment, the central section 204 is planar and oriented nominally orthogonal to the optical axis 153 of the light source 18. The central section 204 refracts on-axis light rays 156 as the on-axis light rays 156 enter the light guide 12. The central section 204 is interposed between a pair of symmetrical lateral sections 206a and 206b that refract off-axis light rays 157. The lateral sections 206a and 206b of the embodiment of FIG. 9B are the same as the lateral sections 206a and 206b of the embodiment of FIG. 9A and will not be described in greater detail. Other combinations of prismatic grooves are possible and each light-redirecting feature 200, as an individual unit, need not be symmetrical.

In addition to or instead of prismatic elements, the light-redirecting features 200 may include arcuate (e.g., lenticular) elements such as semi-cylindrical surfaces, elliptical surfaces, parabolic surfaces, hyperbolic surfaces, surfaces having compound curvature, surfaces designed by ray tracing, aspherical surfaces, etc. In particular, the elements of the light-redirecting features 200 are configured to specularly change the angles at which one or both of the on-axis light rays or the off-axis light rays incident thereon propagate within the light guide 112 relative to the angles at which the on-axis light rays or the off-axis light rays, respectively, would propagate within the light guide 112 if light input edge segment 142 were planar (e.g., devoid of edge features). In other embodiments, the light-redirecting features 200 may include a combination of two or more of prismatic elements, lenticular elements, planar elements and diffusive elements.

Figures 10, 10A, 11B:
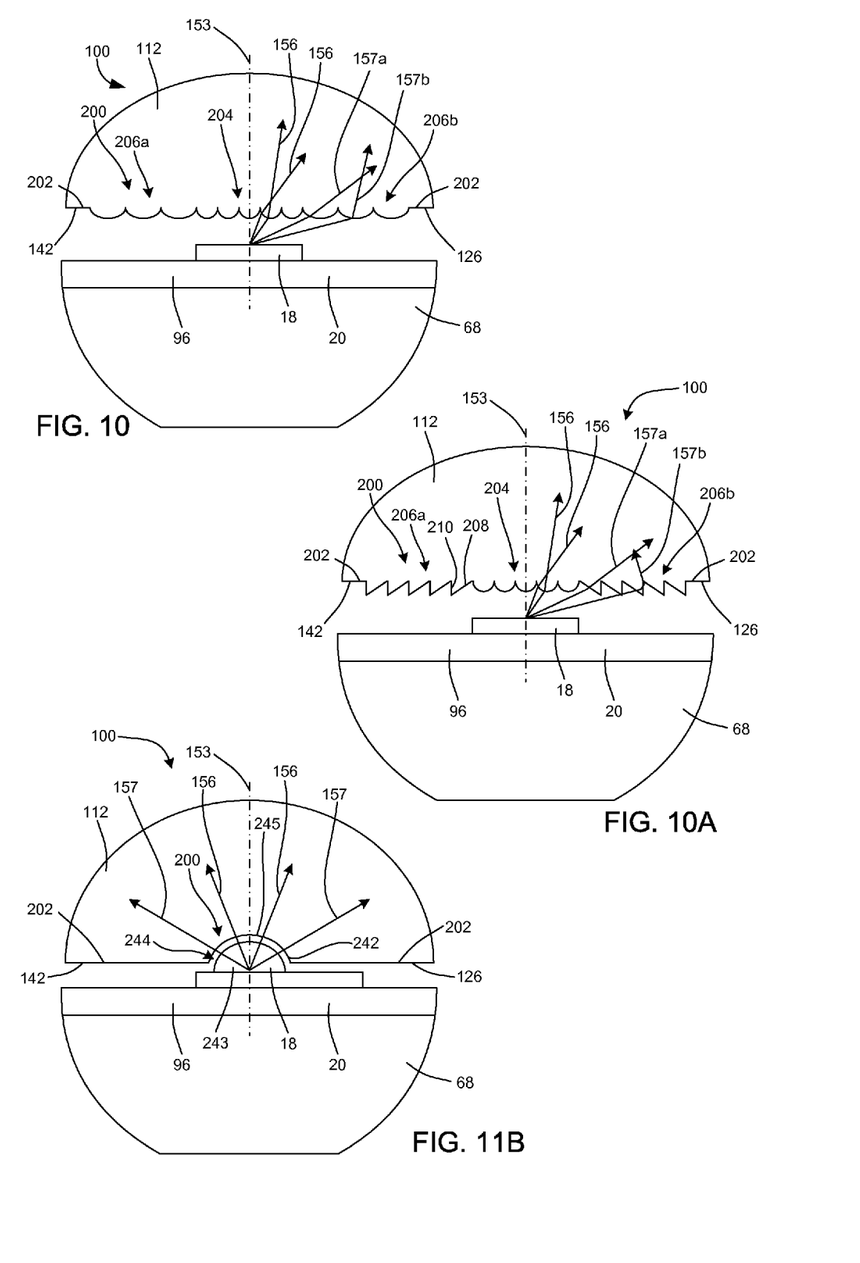
FIG. 10 and FIG. 10A are plan views of a part of another other exemplary lighting assemblies having light redirecting edge features on the light input edge of a light guide.
FIG. 11B is a plan view of a portion of the view of FIG. 11A.

In the embodiment of FIG. 10, for example, the light-redirecting feature 200 includes lenticular features. The lenticular features extend orthogonally to the major surfaces 22, 24 of light guide 112 and are arrayed in the lateral direction. Similar to the embodiments of FIGS. 9A and 9B, the light-redirecting feature 200 of FIG. 10 includes a central section 204 that refracts on-axis light rays 156 as the on-axis light rays 156 enter the light guide 12. The central section 204 is interposed between a pair of symmetrical lateral sections 206a and 206b that refract off-axis light rays 157.

The central region 204 has lenticular features with a smaller radius of curvature than the lateral sections 206. The on-axis and off-axis light rays 156 and 157 will refract in accordance with their angle of incidence with a lenticular feature. Some of the on-axis light rays will propagate in the light guide 112 at a larger angle than if the light input edge 108 had been planar (e.g., the lenticular features laterally spread the on-axis light rays 156). Also, some of the off-axis light rays will propagate in the light guide 112 at a larger angle than if the light input edge 108 had been planar (e.g., the lenticular features laterally spread the off-axis light rays 157). Additionally, some off-axis light rays (e.g., off-axis light rays 157) will enter the light guide 112 through a lenticular feature and totally internally reflect off a distal portion thereof. These rays will propagate in the light guide 112 in the direction of travel after reflection. The propagation angles resulting from interaction of the light from the light source 18 with the light-redirecting feature 200 will cause greater mixing of on-axis and off-axis light rays from more than one light source 18, including mixing of light from multiple light sources 18 with non-parallel optical axes 153. These effects reduce spatial color variations in the light extracted from the light guide 112. In other embodiments, the radii of curvature of lenticular features vary with lateral distance from the optical axis 153 of the light source. In other embodiments, lenticular features and prismatic features both may be present in a light-redirecting feature 200. For example, the edge feature of one embodiment has an on-axis region of lenticular features between off-axis regions of triangular features (FIG. 10A).

In the illustrated embodiment of FIG. 10, the light source 18 is positioned relative to the input edge segment 142 such that the optical axis 153 is aligned with a center lenticular feature from the central section 204. The lateral extent of the central section 204 is such that the light incident thereon is predominantly on-axis light rays 156 and the light incident on lenticular features of the lateral sections 206a, 206b is predominantly off-axis light rays 157.

Figure 11A:
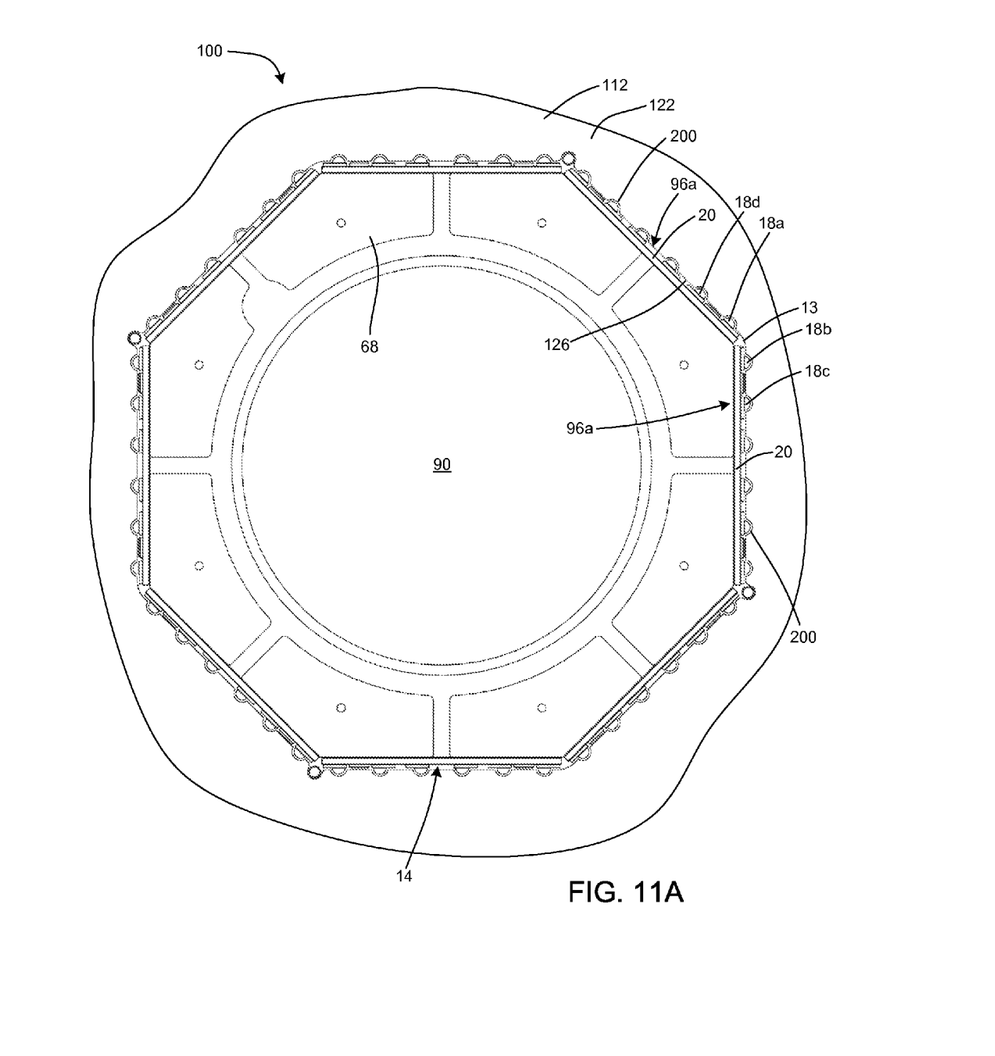
FIG. 11A is a plan view of a part of another exemplary lighting assembly having light-redirecting edge features on the light input edge of a light guide.

FIG. 11A shows an exemplary embodiment of the lighting assembly 100 in which each light input edge segment 142 includes an edge feature 200 opposite each of the light sources 18. Light emitted by each light source 18 is input to the light guide 112 through the respective edge feature 200. In the illustrated embodiment, the light sources 18 are dome-shaped LEDs (e.g., the LEDs described in connection with FIG. 3). FIG. 11B is an enlarged view showing a portion of the exemplary lighting assembly 100 shown in FIG. 11A, including a portion of a light source segment 96 and a corresponding portion of a light input edge segment 142. The portion of light source segment 96 shown includes a light source 18 and the portion of light input edge segment 142 shown includes an edge feature 200 located opposite light source 18 to receive light therefrom.

The edge feature 200 of the embodiment of FIGS. 11A and 11B is structured as an indentation 242 in the light input edge segment 142. The indentation 242 has an arcuate cross-sectional shape in a plane parallel to major surfaces 22 and 24. At least part of a dome-shaped LED 243 constituting light source 18 is located within the indentation 242 in light input edge segment 142. In the example shown, the indentation is configured such that, in a plane parallel to the major surfaces of the light guide 112 through the center of LED 243, the outer surface of the LED 243 and the surface of the indentation are separated by a gap 244. In one embodiment, the indentation 242 has a surface contour shaped to receive the respective light source 18 with a substantially constant separation in a plane parallel to the major surfaces 22, 24. The majority of the on-axis light rays 156 and at least some of the off-axis light rays 157 are incident on the light input surface 245 of the edge feature 200 at small angles of incidence. In the example shown in FIG. 11B, on-axis light rays 156 and off-axis light rays 157 are incident on edge feature 200 at substantially zero angles of incidence within a plane parallel to major surfaces 22 and 24. Hence, there is no or little change in the direction of travel of the light rays due to refraction at the light input edge 142.

Relative to a planar orthogonally oriented light input edge segment, such as light input edge segment 42 shown in FIG. 5, the exemplary edge feature 200 shown in FIGS. 11A and 11B increases the angles at which off-axis light rays 157 propagate within light guide 112 and increases, to a lesser extent, the angles at which on-axis light rays 156 propagate within light guide 112. The increased angles at which on-axis light rays 156 and off-axis light rays 157 propagate within light guide 112 enables light rays 156, 157 emitted by light source 18a to overlap with the light rays 156, 157 emitted by adjacent light source 18b (see FIG. 11A) whose optical axis is diverging from that of light source 18a. As a result, when the on-axis light rays 156 and the off-axis light rays 157 emitted by light sources 18a, 18b have the above-described difference of color, the light extracted from minor sector 132 (FIG. 6B) is closer in color to the light extracted from major sector 130 illuminated by light sources 18 whose optical axes 153 are parallel (e.g., light sources 18b and 18c or light sources 18a and 18d). The exemplary embodiment described with reference to FIGS. 11A and 11B reduces spatial color variations in the light extracted from light guide 112 by spreading the light from light sources 18 laterally so that light from adjacent light sources 18a, 18b overlaps within the light guide.

In this disclosure, the phrase "one of" followed by a list is intended to mean the elements of the list in the alternative. For example, "one of A, B and C" means A or B or C. The phrase "at least one of" followed by a list is intended to mean one or more of the elements of the list in the alternative. For example, "at least one of A, B and C" means A or B or C or (A and B) or (A and C) or (B and C) or (A and B and C).

What is claimed is:

1. A lighting assembly, comprising:
    a first light source and a second light source each comprising a pump light source and nominally of the same structural construction, and each having an optical axis extending orthogonally from a center of its light emitting surface, the light sources comprising wavelength converting material and arranged with their optical axes diverging from their respective light emitting surfaces without intersecting, each of the light sources configured to emit respective light comprising on-axis light rays and off-axis light rays, the on-axis light rays emitted at smaller angles relative to the optical axis of the light source than the off-axis light rays that are emitted at larger angles relative to the optical axis of the light source, the off-axis light rays spectrally different from the on-axis light rays; and
    a light guide comprising:
        a light input edge comprising a first input edge segment adjacent the first light source and a second input edge segment adjacent the second light source, the first input edge segment non-parallel to the second input edge segment such that an obtuse angle is formed between the first input edge segment and the second edge segment; and
        opposed major surfaces between which the light from the light sources propagates by total internal reflection,
    wherein at least one of the first input edge segment and the second input edge segment comprises a light-redirecting edge feature opposite the respective light source to receive the light therefrom, the edge feature configured to specularly redirect at least one of the on-axis light rays and the off-axis light rays in a way that, compared with the respective input edge segment without the edge feature, increases overlap between the on-axis light rays from the first of the light sources and the off-axis light rays from the second of the light sources propagating within the light guide, the increased overlap decreasing spatial color variations between light extracted from the light guide in a region between the light sources and a region in front of either of the respective light sources.

2. The lighting assembly of claim 1, wherein the edge feature is configured to receive at least some of the on-axis light rays and the off-axis light rays at smaller angles of incidence than angles of incidence of the on-axis light rays and the off-axis light rays that would be received by the respective input edge segment without the edge feature.

3. The lighting assembly of claim 1, wherein the edge feature comprises an indentation in the light input edge.

4. The lighting assembly of claim 3, wherein no more than one respective indentation is opposite each light source.

5. The lighting assembly of claim 3, wherein, in a plane parallel to the major surfaces, the indentation has an arcuate cross-sectional shape.

6. The lighting assembly of claim 3, wherein the light source comprises a body at least partially disposed in the indentation in the light input edge.

7. The lighting assembly of claim 1, wherein the edge feature comprises a refractive surface oriented non-parallel to the respective light input edge segment.

8. The lighting assembly of claim 1, wherein the edge feature comprises a refractive surface near the optical axis of the light source, the refractive surface oriented to increase the angle of refraction at which at least some of the on-axis light rays refract into the light guide relative to the angle of refraction at which the on-axis light rays would refract into the light guide if the refractive surface were orthogonal to the optical axis.

9. The lighting assembly of claim 1, wherein the edge feature comprises:
    a first refractive surface near the respective optical axis, and oriented non-orthogonal to the respective optical axis and oriented such that one of the on-axis light rays and the off-axis light rays has a substantially zero angle of incidence thereon; and
    a second refractive surface adjacent the first refractive surface.

10. The lighting assembly of claim 1, wherein the edge feature comprises at least one of lenticular features, triangular features, and sawtooth features.

11. The lighting assembly of claim 10, wherein the lenticular features comprise lenticular features of differing radii of curvature.

12. The lighting assembly of claim 10, wherein the triangular features comprise triangular features of differing apex angles.

13. The lighting assembly of claim 1, wherein the edge feature comprises an on-axis region of lenticular features between off-axis regions of triangular features.

14. The lighting assembly of claim 1, wherein the edge feature comprises an on-axis region of triangular features between off-axis regions of sawtooth features.

15. The lighting assembly of claim 14, wherein the edge feature comprises:
two off-axis planar surface regions parallel to the light input edge segment laterally offset from the optical axis; two off-axis regions of sawtooth features between the planar surface regions; and an on-axis region of triangular features between the regions of sawtooth features.

16. The lighting assembly of claim 1, wherein the edge feature comprises an on-axis planar surface region parallel to the light input edge segment between off-axis regions of sawtooth features.

17. The lighting assembly of claim 1, wherein the edge feature comprises sawtooth features comprising refractive surfaces that vary in angle relative to the optical axis as a function of lateral distance from the optical axis.

18. The lighting assembly of claim 1, wherein the edge feature comprises at least one of triangular features, sawtooth features, and lenticular features in between planar surface segments parallel to the light input segment.

19. The lighting assembly of claim 18, wherein the features comprise indentations in or protrusions from the respective light input edge segment.

20. The lighting assembly of claim 1, wherein each of the first input edge segment and the second input edge segment comprises a respective edge feature.

21. The lighting assembly of claim 1, wherein the light sources each comprise a light emitting diode (LED) and the wavelength-shifting material comprises phosphor in the form of a phosphor-doped encapsulant, and the on-axis light rays have shorter optical paths through the encapsulant than the off-axis light rays.

22. The lighting assembly of claim 1, wherein:
the first input edge segment comprises the edge feature as a first edge feature and the second input edge segment additionally comprises an edge feature as a second edge feature,
the first edge feature is located relative to the first light source such that at least some of the light from the first light source enters the light guide through the first edge feature,
the second edge feature is located relative to the second light source such that at least some of the light from the second light source enters the light guide through the second edge feature, and
the first edge feature is configured to redirect at least some of the on-axis light rays emitted by the first light source and the second edge feature is configured to redirect at least some of the off-axis light rays emitted by the second light source such that at least some of the on-axis light rays emitted by the first light source and at least some of the off-axis light rays emitted by the second light source overlap within the light guide.

23. The lighting assembly of claim 1, wherein:
the light guide further comprises:
a vertex between the first input edge segment and the second input edge segment;
a first major sector extending from the first light input edge segment and overlapping with the optical axis of the first light source;
a second major sector extending from the second light input edge segment and overlapping with the optical axis of the second light source; and
a minor sector extending from the vertex between the first major sector and the second major sector; and
the light-redirecting edge feature of the at least one of the first input edge segment and the second input edge segment is configured to specularly redirect at least one of the on-axis light rays and the off-axis light rays in a way that, compared with the respective input edge segment without the edge feature, increases overlap between the on-axis light rays from the first of the light sources and the off-axis light rays from the second of the light sources propagating within the light guide in the minor sector.

24. The lighting assembly of claim 23, wherein a width of the minor sector increases as a function of distance from the vertex.

25. A lighting assembly, comprising:
dome-shaped LED light sources comprising wavelength converting material and having respective optical axes extending orthogonally from a center of their respective light emitting surfaces, the light sources arranged with their optical axes diverging in a plane from their respective light emitting surfaces without intersecting;
a light guide, comprising:
opposed major surfaces substantially parallel to the plane; and
a light input edge comprising a first input edge segment and a second input edge segment adjacent the first input edge segment such that an obtuse angle is formed between the first input edge segment and the second edge segment, at least one of the first input edge segment and the second input edge segment comprising a respective indentation having a surface contour shaped to receive the respective light sources with a substantially constant separation in the plane.

* * * * *